Dec. 22, 1931.  H. W. JARROW  1,837,443
GASKET
Filed July 11, 1930
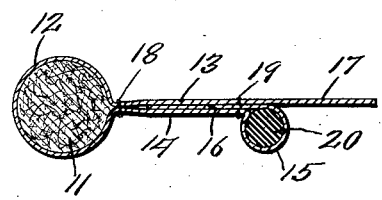
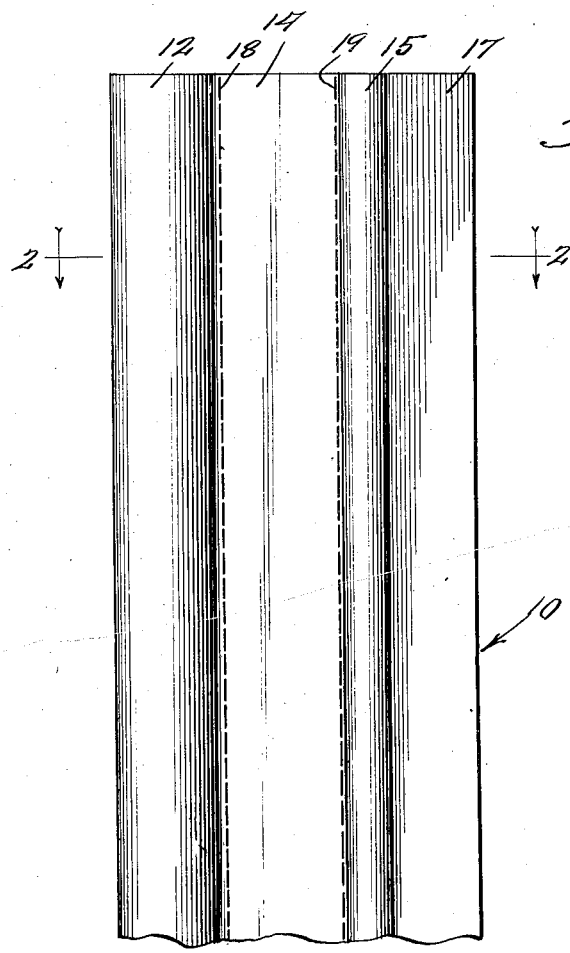

Patented Dec. 22, 1931

1,837,443

UNITED STATES PATENT OFFICE

HARRY W. JARROW, OF CHICAGO, ILLINOIS

GASKET

Application filed July 11, 1930. Serial No. 467,289.

This invention relates to gaskets of the character adapted for use as packing around refrigerator doors, as a weather strip for doors, windows and so on, and for various other uses where a seal is required.

One of the objects of this invention is to provide a gasket in which a roll of soft fibrous material is closely confined by an envelope of flexible waterproof fabric which is extended to provide a relatively stiff tacking flange terminating in a longitudinally extending bead, one end of said fabric extending beyond said bead to form an additional tacking flange for said gasket.

Another object of this invention is to produce a strong, simple and inexpensive, flexible gasket having a neat appearance and provided with a flexible strip having a relatively large packing retaining portion encasing a body of yielding packing, and an attaching flange extending from one side of said packing-retaining portion. The free end of said flange is provided with a relatively small tubular portion for receiving a body of packing to form a substantially double cushion gasket, and an additional flange extending beyond said small tubular portion formed by the free edge of said flexible strip.

A further object of this invention is to provide a strong, simple and inexpensive, flexible gasket having a neat appearance and provided with a strip of flexible, pliable material having tubular, backing-retaining portions spaced from each other and connected with each other by a strong attaching flange formed integral therewith, a tubular body of yielding packing enclosed within each of said retaining portions, and a single-ply flange extending beyond one of said tubular retaining portions.

A still further object of this invention is to provide a flexible gasket having a neat appearance and provided with a flexible strip having a relatively large tubular packing-retaining portion encasing a body of yielding packing, said flexible strip having a second relatively small tubular packing-retaining portion which is connected to said first packing-retaining portion by an intermediate flange formed integral therewith to provide a substantially double cushion gasket, and a single-ply flange extending beyond said small tubular portion formed by the free edge of said flexible strip.

A still further object of this invention is to provide a strong, simple and inexpensive gasket having a neat appearance and having a strip of flexible, pliable material having tubular packing-retaining portions spaced from each other and connected with each other by a strong attaching flange formed integral therewith, a body of yielding packing enclosed within each of said tubular retaining portions and a single-ply flange formed by extending one ply of said connecting flange beyond one of said tubular retaining portions.

A still further object of the invention is to provide a gasket of the character described which will be neat in appearance, simple, strong, compact, easy and cheap to manufacture, and efficient in carrying out the purposes for which it is designed.

With the foregoing and other objects in view, which will appear as the description proceeds, the invention consists in certain novel features of construction, arrangement and combination of parts hereinafter more fully described, illustrated in the accompanying drawings and particularly pointed out in the appended claims, it being understood that various changes in the form, proportion, size and minor details of the structure may be made without departing from the spirit or sacrificing any of the advantages of the invention.

For the purpose of facilitating an understanding of my invention I have illustrated in the accompanying drawings a preferred embodiment thereof, from an inspection of which, when considered in connection with the following description, my invention, its mode of construction and assembly and many of its advantages should be readily understood and appreciated.

Referring to the drawings in which the same characters of reference are employed to indicate corresponding or similar parts throughout the several figures of the drawings:

Figure 1 is a fragmentary elevation of a gasket or weather strip embodying my invention; and Figure 2 is a sectional view through the same taken on line 2—2 of Figure 1.

Referring to the drawings more specifically by characters of reference, the numeral 10 designates generally a gasket or weather strip comprising an elongated body of yielding packing 11 which may be made of soft fibrous cord, the body of packing being primarily circular in cross-section, as shown in Figure 2, and it can be compressed or flattened upon the application of pressure thereto. This packing will freely yield to form an effective seal, and when the pressure is relieved it will tend to return to the substantially circular shape shown in Figure 2.

The gasket includes a strip of flexible, pliable material, preferably waterproof fabric, which may be rubberized, said fabric having an enclosing middle portion 12 surrounding the elongated body of packing 11. Intermediate portions 13 and 14 extend from one side of the packing, the said intermediate portion 14 being folded backwardly on itself to provide the tubular enclosing portion 15, the free edge 16 of said portion 14 being disposed between the intermediate portions 14 and 13. In the preferred form of the invention the interposed marginal portion 16 is in contact with the inner faces of the intermediate portions 13 and 14 as shown in Figure 2. The marginal edge 17 of the intermediate portion 13 is extended beyond the tubular enclosing portion 15 to form a single-ply flange. The tubular portion 15 is adapted to receive therein a suitable filler 20, which may be of cotton, soft or hard rubber, cord, or any other suitable packing material.

As shown in the drawings, the inner edges of said intermediate portions 13 and 14 are in contact with each other at the junction of the enclosing middle portion 12 and intermediate portions 13 and 14. At the junction just referred to a row of stitches 18 passes through and unites the said intermediate portions so as to closely confine the body of packing in the enclosing middle portion 12. Similarly, a row of stitches 19 passes through the intermediate portions 14, 13 and the marginal portion 16 at the junction of the enclosing tubular portion 15 so as to closely confine the body of packing within said tubular portion.

It will thus be noted that the several elements are thus combined with each other to closely confine the bodies of packing 11 and 20, which bodies are protected by the enclosing portions 12 and 15 of the flexible, pliable strip, and the portions 13 and 14 are united to form a strong attaching flange adapted to receive suitable attaching devices. This flange is reinforced by the interposing marginal portion 16. In addition to the relatively strong flange there is provided the single-ply flange 17 by means of which the gasket may be secured in placed, the natural flexibility of the material holding the same in place. In operation, the single flange, as well as the three-ply flange, is approximately radial to the body of the packing, but owing to the flexibility of the strip of the fabric, a hingelike connection is formed at the stitches 18 when the gasket is attached by means of the three-ply flange, and a hingelike connection is formed at the stitches 19 when the same is attached by means of the single-ply flange 17.

By forming the gasket in the manner above described, a strong and neat appearing double cushion weather strip is produced which is provided with a three-ply flange intermediate the tubular packing-retaining portions, and a single-ply flange extending beyond one of said bodies of packing.

From the foregoing it will be apparent that the invention presents an efficient, simple, strong and economical form of double cushion gasket adapted to be readily applied between objects and to form an effective seal therebetween.

It is believed that my invention, its mode of construction, operation and assembly, and many of its advantages should be readily understood from the foregoing without further description, and should also be manifest that while a preferred embodiment of the invention has been shown and described for illustrative purposes, the details are nevertheless capable of wide variation within the purview of my invention as defined in the appended claims.

What I claim and desire to secure by Letters Patent of the United States is:—

1. As a new article of manufacture, a gasket comprising a strip of flexible material having spaced tubular enclosing portions, an intermediate, substantially flat web connecting said tubular enclosing portions, one marginal edge of said strip extending beyond one of said tubular portions to form a single-ply flange.

2. As a new article of manufacture, a gasket comprising a strip of flexible material having an elongated, tubular enclosing portion provided intermediate the ends thereof, a roll of fibrous material enclosed within said tubular enclosing portion, the said strip of material also having a single ply marginal flange extending from one of the edges of said tubular portion and a two ply-marginal flange extending from the other edge of said tubular portion, the free edge of said two-ply marginal flange being provided with a tubular enclosing portion, a roll of packing received in said last-mentioned tubular enclosing portion, said single ply marginal flange extending beyond said last mentioned tubular enclosing portion, and rows of stitches passing through said marginal flanges for confining the packing in said tubular portions.

3. As a new article of manufacture, a gasket comprising an elongated body of yielding packing, a strip of flexible pliable material having a tubular enclosing portion surrounding said packing, said strip of material also having a single ply marginal flange extending from one of the edges of said tubular portion and a two-ply marginal flange extending from the other edge of said tubular portion, the free edge of said two-ply marginal flange being also provided with a tubular enclosing portion smaller in size than the first mentioned tubular enclosing portion, a body of packing disposed within said smaller tubular enclosing portion, said single ply marginal flange extending beyond said last mentioned tubular enclosing portion to form an attaching flange, and rows of stitches passing through said marginal flanges for confining the packing in their respective tubular enclosing portions.

4. As a new article of manufacture, a gasket comprising an elongated body of yielding packing, a strip of flexible, pliable material having a tubular enclosing portion surrounding said packing, said strip of material also having a single ply marginal flange extending from one of the edges of said tubular portion and a two-ply marginal flange extending from the other edge of said tubular portion, the free edge of said two-ply marginal flange being provided with a tubular enclosing portion, a roll of packing disposed within said last-mentioned tubular enclosing portion, the intermediate portion of said single ply marginal flange and said two-ply marginal flange being arranged adjacent to each other to provide a comparatively stiff flat web, the free marginal edge of said single ply flange extending beyond said second tubular portion to provide a single ply flange, and rows of stitches passing through said marginal flanges for confining the said packing in their respective tubular enclosing portions.

5. As a new article of manufacture, a gasket comprising a strip of flexible, pliable material having spaced tubular enclosing portions connected together by an intermediate substantially flat web portion, bodies of packing disposed within said tubular enclosing portions, said strip having a single ply marginal flange extending from one of the edges of one of said tubular enclosing portions to a point beyond the other one of said tubular enclosing portions to provide an attaching flange, and rows of stitches passing through said flat web portion for confining the packing in their respective tubular enclosing portions.

6. As a new article of manufacture, a gasket comprising an elongated body of yielding packing, a strip of flexible, pliable material having a tubular enclosing portion surrounding said packing, said strip of material also having a single ply marginal flange extending from one of the edges of said tubular portion and a two-ply marginal flange extending from the other edge of said tubular portion, the free edge of said two-ply marginal flange being provided with a tubular enclosing portion, a body of packing disposed within said last-mentioned tubular portion, said single ply flange extending beyond said two-ply flange to form a single ply attaching flange, the intermediate portion of said single ply flange and the two-ply flange being arranged adjacent to each other to provide a comparatively stiff web portion, and rows of stitches provided at the edges of said tubular enclosing portions so as to confine the packing in their respective tubular portions.

7. As a new article of manufacture, a gasket comprising an elongated body of yielding packing, a strip of flexible, pliable material having a tubular enclosing portion enclosing the said packing, said strip of material also having a single ply marginal flange extending from one of the edges of said tubular portion and a two-ply marginal flange extending from the other edge of said tubular portion, the free edge of said two-ply marginal flange being provided with a tubular enclosing portion, a body of packing disposed within said last-mentioned tubular portion, the free marginal edge of said single ply marginal flange extending beyond the said second tubular portion to form a single ply attaching flange, the intermediate portion of said single ply flange being arranged adjacent to said two-ply flange to form a comparatively stiff web portion, a row of stitches at the junction of said marginal flanges and the edges of said first tubular portion, and a second row of stitches passing through said marginal flanges adjacent the edges of said second tubular portion.

In testimony whereof I affix my signature.

HARRY W. JARROW.